United States Patent [19]

Gaidis

[11] Patent Number: 5,023,290
[45] Date of Patent: Jun. 11, 1991

[54] COMPOSITIONS AND METHODS FOR WATERPROOFING WET STRUCTURES FORMED FROM WATER-PENETRABLE CONSTRUCTION MATERIALS

[75] Inventor: James M. Gaidis, Ellicott City, Md.
[73] Assignee: W. R. Grace & Co.-Conn., New York, N.Y.
[21] Appl. No.: 243,377
[22] Filed: Sep. 12, 1988
[51] Int. Cl.$^5$ ................................................. C08K 5/09
[52] U.S. Cl. ..................................... 524/320; 524/322
[58] Field of Search ................................. 524/322, 320

[56] References Cited

U.S. PATENT DOCUMENTS

| | | | |
|---|---|---|---|
| 3,333,980 | 8/1967 | McCord | 106/308 |
| 3,402,100 | 9/1968 | Malchick | 162/164 |
| 3,625,807 | 10/1969 | Beemer | 161/38 |
| 3,741,856 | 6/1973 | Hurst | 161/88 |
| 3,853,682 | 12/1974 | Hurst | 161/92 |
| 3,900,102 | 8/1975 | Hurst | 206/411 |
| 3,936,311 | 2/1976 | Kirst et al. | 106/90 |
| 3,951,722 | 4/1976 | Howson et al. | 156/307 |
| 4,172,830 | 10/1979 | Rosenberg et al. | 428/245 |
| 4,283,316 | 8/1981 | Bonsignore | 260/23 XA |
| 4,455,146 | 6/1984 | Noda et al. | 604/897 |

*Primary Examiner*—Paul R. Michl
*Assistant Examiner*—Karen A. Hellender
*Attorney, Agent, or Firm*—Chester Cekala; William L. Baker

[57] ABSTRACT

Disclosed are waterproofing agent primer compositions which can be applied to wet and dry structures and methods of waterproofing structures made of water-penetrable construction materials which can be used on wet and dry structures. The primer compositions include a $C_8$–$C_{18}$ fatty acid, a natural or synthetic rubber, a resin, and an organic solvent.

8 Claims, No Drawings

COMPOSITIONS AND METHODS FOR WATERPROOFING WET STRUCTURES FORMED FROM WATER-PENETRABLE CONSTRUCTION MATERIALS

BACKGROUND OF THE INVENTION

1. Field of the Invention

The present invention relates to compositions and methods useful for waterproofing or dampproofing various water-penetrable materials used in building construction and other civil engineering projects. Specifically, the invention relates to new primer compositions and methods of using these compositions which eliminate the need for allowing construction materials to dry prior to applying waterproofing or dampproofing agents.

2. Description of Related Art

Various materials used in building construction and other civil engineering projects such as roads and bridges are susceptible to water penetration resulting either from their inherent properties or imperfections such as cracks or pores. Reducing or eliminating water penetration through structures formed of these materials often is desirable, and may be critical in certain structures such as those housing expensive electrical equipment or tunnels moving vehicular or pedestrian traffic under bodies of water. Available waterproofing agents include coal tar-based and asphalt-based compositions. Asphalt-based compositions are preferred; most preferred are preformed, single or multilayer sheets of waterproofing, asphalt-based adhesives such as described in U.S. Pat. Nos. 3,741,856; 3,853,682; and 3,900,102. Bituthene ® brand of waterproofing membranes is an example of preferred, commercially available asphalt-based waterproofing agents.

Many currently available waterproofing agents are very effective when applied correctly. Correct application of currently available materials, however, requires that the structure be dry before the waterproofing agent is applied. Although waterproofing agents have been used for many years, for example, Bituthene ® has been used for approximately 20 years, no acceptable method for applying waterproofing materials to wet structures has been developed. Thus, inclement weather and the time required for curing of hydrophilic construction materials such as concrete result in delays which increase construction costs. Therefore, there has been and remains a need for compositions and methods which enable application of waterproofing agents to dry, wet, or incompletely cured construction materials.

U.S. Pat. No. 4,172,830 to Rosenberg et al. is one of many examples of references disclosing sheet-like flexible materials used for waterproofing.

U.S. Pat. No. 3,333,980 to McCord describes use of a very thin, oriented layer of fatty acid deposited on the surface of water-insoluble particles in aqueous media to render the particles hydrophobic and organophilic. Uses attributed to the invention described in this patent are surface treatment of pigments used in paint and cosmetic manufacture and use as fillers and bonding agents in manufacture of refractories and plastics.

U.S. Pat. No. 3,936,311 to Kirst et al. describes coating materials for buildings, which renders the buildings water-repellent, consisting of cement and/or lime, fillers, and water which contain, as a hydrophobing additive, 0.1–3% by weight of one or more water-soluble esters of saccharose and fatty acids preferably having 10–20 carbon atoms.

U.S. Pat. No. 3,625,807 to Beemer, describes an adhesive composition comprising a diene elastomer, for example, a butadiene-styrene copolymer, and a fatty acid in a volatile solvent. In these compositions, fatty acids are included as emulsifiers.

U.S. Pat. No. 3,951,722 to Howson et al. discloses contact adhesive compositions including a polychloroprene and saturated hydroxy-carboxylic acid in an organic solvent.

U.S. Pat. No. 4,283,316 to Bonsignore discloses treatment of alumina-hydrate to make its surface compatible with thermoplastic resins.

U.S. Pat. No. 4,455,146 to Noda et al. teaches human skin applications for compositions including thermoplastic elastomers and higher fatty acids.

SUMMARY OF THE INVENTION

The present invention relates to compositions and methods useful for attaching waterproofing agents to water-penetrable construction materials. More specifically, the present invention relates to new primer compositions including $C_8$ to $C_{18}$ fatty acids and methods of using these compositions to apply waterproofing agent to construction materials which may be wet, contaminated, or incompletely cured hydrophilic materials.

DETAILED DESCRIPTION OF THE INVENTION

Optimum waterproofing of structures such as buildings, bridges, roads, and tunnels requires bonds between the structure and waterproofing agent which endure essentially for the life of the structure. These enduring bonds are even important in applications such as subterranean basements, where the backfill would hold the waterproofing agent in place, to prevent migration along the surface of the structure of water which may enter through damaged areas of the waterproofing agent. To achieve enduring bonds between structures and waterproofing agents, primers usually are applied prior to application of the waterproofing agent. None of the primers currently available provide sufficiently enduring bonds when applied to wet structures or structures of hydrophilic materials that are not yet cured.

The present invention resides in the discovery that adding certain fatty acids or combinations thereof to currently available waterproofing agent primers results in compositions which form sufficiently strong and enduring bonds between waterproofing agents and structures even when the primer is applied to a structure that is wet. As used herein, a wet structure is one that has moisture on its surface, moisture contained within that could migrate to its surface before an applied waterproofing agent primer was completely dried, or is constructed of a hydrophilic material, such as Portland cement concrete, that is incompletely cured. The fatty acids used in these compositions are fatty acids having from about 8 to about 18 carbon atoms and are straight-chain or branched, and may be saturated or unsaturated. Fatty acids having an even number of carbon atoms are preferred. Stearic, lauric, and palmitic acids are more preferred; myristic (tetradecanoic) acid is most preferred. The invented compositions contain one or more $C_8$–$C_{18}$ fatty acids in an amount adequate to produce a sufficiently strong and enduring waterproofing agent-structure bond, determined as described below, when the primer composition is applied to a wet structure, preferably in a concentration from about 0.1% to about 3% weight-to-weight (W/W). The invented compositions are prepared by mixing, preferably forming a solution of, an appropriate amount of one or more $C_8$-$C_{18}$ fatty acids with a conventional waterproofing agent primer.

Conventional waterproofing agent primers used in making the invented compositions generally are mixtures of natural or synthetic rubbers and diluent or filler resins in organic solvents. The rubbers which can be used include neoprene, butyl rubber, natural rubber or, styrene-butadiene random or block copolymers with block copolymers preferred. Other natural or synthetic rubbers useable in this invention are those that provide sufficient primer-structure adhesion and are known to and readily determinable by those skilled in the art. Preferred amounts of natural or synthetic rubbers are about 1% to 25%, about 12% is most preferred when the rubber is a styrene-butadiene block copolymer. Optionally, the included rubber can be extended by addition of any of the standard oils used to extend rubbers. The amount of oil added is up to 66%, about 50% is preferred.

The diluent or filler resins included in the primers generally are known to those skilled in the art and include hydrocarbon resins such as coumarone-indene resins, polyterpenes, and aromatic petroleum resins, optionally alkylated. Asphalt also is such a resin. Nevchem®, a commercially available hardening resin, is preferred.

The organic solvents in the conventional primers used to make the invented compositions can be any organic solvent in which the fatty acids to be used are sufficiently soluble to prepare primer compositions of the present invention. Such solvents generally are known or readily determinable by standard methods and include mineral spirits, ethers, alcohols, ketones, or, preferably, xylene.

The invented compositions are used with known liquid or preformed solid waterproofing materials based on coal tar or asphalt. Asphalt-based waterproofing materials are preferred. Especially preferred are waterproofing materials constructed of preformed, multilayer, flexible sheets including an asphalt layer and a water-impenetrable polymeric film layer. Various flexible sheet waterproofing agents are commercially available. Bituthene® brand waterproofing membranes are preferred commercially available waterproofing agents.

Various civil engineering structures including, for example, buildings, bridges, roads, and tunnels, are made waterproof using the present invention. As used herein, making a structure "waterproof" means reducing or eliminating the ability of water to penetrate the structure. The present invention is used to make waterproof structures constructed of materials which are water-penetrable either inherently or as a result of imperfections such as cracks or pores. The types of water-penetrable construction materials with which the present invention is used include wood, brick, stone, blended cements, pozzolanic cements, or concrete, preferably Portland cement concrete.

According to the presently invented methods for reducing water penetration through a structure, initially a primer which when applied to a wet structure has the ability to form a sufficiently strong and enduring bond between the surface of the structure and a subsequently affixed waterproofing agent is applied and allowed to dry. Thereafter, a waterproofing agent is affixed to the primer-coated structure surface. Preferred primers having the properties to form sufficiently enduring bonds between structure surfaces and waterproofing materials even when applied to wet structures are the presently invented compositions containing fatty acids.

Using the invented methods, the primer preferably is applied to a structure surface at a coverage rate of from 5 to 10 square meters per liter, more preferably 6 to 8 square meters per liter, with a final film thickness of about 0.03 millimeters. The waterproofing agents subsequently affixed to the primer coated structure surface either are adhesive or non-adhesive. When non-adhesive waterproofing agents are used or when it is desirable to affix a non-adhesive surface of an adhesive waterproofing agent to the primer, the primer is made tacky by standard methods known in the art such as by using softer rubbers, using less resin, or using more oil in the rubber. In the most preferred method the structure to be waterproofed is coated with a fatty acid containing primer and then a single or multilayer sheet of waterproofing asphalt-based adhesive, preferably a sheet having a major exposed adhesive surface and a second major exposed non-adhesive surface, such as Bituthene® brand of waterproofing membrane, is applied so that an adhesive surface of the waterproofing agent is in contact with the primer. In some applications, however, it may be desirable to apply such sheets of waterproofing agents so that a non-adhesive surface of the waterproofing agent is in contact with the primer-coated structure surface.

The Example 3 procedure is used to determine whether a primer applied to a wet structure surface has the ability to produce a sufficiently strong and enduring bond between the waterproofing agent and structure surface. Using this test, primers applied to wet structure surfaces that at 28 days produce waterproofing agent-structure bond strengths that are at least 33% of, preferably at least 50% of, more preferably at least 66% of the bond strengths produced when applied to dry structure surfaces are defined as producing sufficiently strong and durable bonds to enable their use in the invention. As used herein, primers meeting these criteria are referred to as primers which can be used on wet and dry structures.

In making the above described invention, the inventor was surprised to discover that the surface active properties of fatty acids alone apparently are not the basis for their utility in primers which can be satisfactorily applied to wet structures. The inventor initially tested a variety of other surface active agents such as Pluronic L-92, Pluronic 25 R-2 (both non-ionic surfactants) and Bitran H (a cationic surfactant), and discovered that none of them when added to primers applied to wet structures resulted in bonds between the structures and waterproofing agents of sufficient strength and durability. As a result, although not intending to be bound to any particular mechanism by which the fatty acids produced the unexpected results, it is believed that the fatty acid primers are operable even when applied to wet structures because the fatty acids produce a chemical bond between the structure, particularly alkaline structures such as concrete, and the primer. Thus, contemplated equivalents of the present invention are primers operable when applied to wet structures which contain other types of compounds which form chemical bonds between the structure and primer.

EXAMPLE 1

Primer Containing Myristic Acid

Myristic acid (1%) was mixed using a sonic bath into commercially available Bituthene® P-3000 primer. The composition thus prepared contained 1% myristic acid, about 12% styrene-butadiene block copolymer extended 50% with oil, and 12% Nevchem®140 (alkylated aromatic non-saponifiable petroleum hydrocarbon resin with softening point of about 140° C.) in xylene. The composition thus prepared was applied and tested according to the procedure described in Example 3, and the results are shown in Tables I and II, below.

EXAMPLE 2

Primer Containing Stearic Acid

A composition similar to that described in Example 1 was prepared by adding stearic acid (1%) to Bituthene® P-3000 primer. This composition also was applied and tested as described in Example 3, and the results of such testing are displayed in Tables I and II, below.

EXAMPLE 3

Bond Strength Testing Procedure

The building material used in this testing procedure are porous concrete blocks (7½ inches by 15¼ inches, by 1½ inches thick) obtainable from a conventional building materials supplier. The blocks first are saturated with water and then a paste of Type I cement is applied to produce a uniform layer. The pasted blocks to be used in wet-surface testing then are cured in a 100% relative humidity environment for at least seven days and dried before use.

For testing, the block surface is divided into 3 equivalent sections and 4 grams of primer are applied to each section (6 sq. meter/liter). Dry blocks are primed and allowed 4 hours drying time. Some blocks are wetted and primed in water ⅛ inch below the block surface; also 7.6 mL of water was poured onto the surface (100 mL/sq. meter). The primed wet block then was removed from water and allowed to dry for 4 hours.

Each section of the wet and dry primed blocks then receives two 2"×7" strips of Bituthene-3000 which are rolled 3 times with a 20.85 lb roller. The primed, wet block is submerged in water and the dry, primed block is kept dry until bond strength is tested. At selected times bond strength between the Bituthene® and blocks is measured using 90° angle, 2"/minute tensile testing machine.

Table I shows bond strength between Bituthene® brand waterproofing membrane and pasted block at 14 days following application to dry or wet blocks using Bituthene® P-3000 primer with or without added fatty acids.

TABLE I

| Fatty Acid Content | Bond Strength (lb./in.) - 14 days | |
| --- | --- | --- |
| | Dry | Wet |
| 1% Myristic | 12.3 | 7.2 |
| 1% Myristic | 13.3 | 9.0 |
| 1% Myristic | 14.0 | 11.2 |
| 1% Myristic | 12.0 | 8.8 |
| 1% Stearic | 11.3 | 4.6 |
| 1% Stearic | 11.3 | 3.0 |
| 1% Stearic | 14.3 | 9.0 |
| 1% Stearic | 13.5 | 7.5 |
| None | 13.3 | 0.3 |

TABLE I-continued

| Fatty Acid Content | Bond Strength (lb./in.) - 14 days | |
| --- | --- | --- |
| | Dry | Wet |
| None | 12.8 | 2.4 |
| None | 11.0 | 1.7 |
| None | 11.8 | 2.0 |

Table II shows bond strength between Bituthene® brand waterproofing membrane and pasted block at 14 and 28 days following application to dry or wet block using Bituthene® P-3000 primer with or without added fatty acids.

TABLE II

| Fatty Acid Content | Bond Strength (lb./in.) | | | |
| --- | --- | --- | --- | --- |
| | 14 Days | | 28 Days | |
| | Dry | Wet | Dry | Wet |
| 1% Myristic | 12.9 | 9.1 | 13.3 | 10.2 |
| 1% Stearic | 12.6 | 6.0 | 12.0 | 8.1 |
| None | 12.2 | 1.6 | 12.2 | 1.9 |

Table III shows bond strength between bituthene® brand waterproofing membrane and pasted block at 28 and 120 days following application to dry or wet block using Bituthene® P-3000 primer with different concentrations of various straight chain, saturated fatty acids.

TABLE III

| Fatty Acid | Fatty Acid Concentration (%) | Bond Strength (lb/in) | | | |
| --- | --- | --- | --- | --- | --- |
| | | 28 Days | | 120 Days | |
| | | Dry | Wet | Dry | Wet |
| $C_6$ | .25 | 11.8 | 3.1 | 14.0 | 3.4 |
| | 1.0 | 12.6 | 1.3 | 14.9 | 2.7 |
| | 2.0 | 13.4 | 5.5 | 11.5 | 2.8 |
| $C_8$ | .25 | 11.9 | 5.0 | 12.3 | 5.5 |
| | 1.0 | 7.4 | 5.0 | 10.4 | 5.3 |
| | 2.0 | 7.6 | 1.3 | 11.8 | 3.3 |
| $C_{10}$ | .25 | 12.3 | 8.1 | 14.6 | 5.1 |
| | 1.0 | 9.4 | 2.3 | 11.5 | 1.9 |
| | 2.0 | 8.8 | 3.5 | 11.3 | 5.0 |
| $C_{12}$ | .25 | 9.2 | 11.6 | 11.0 | 3.0 |
| | 1.0 | 7.6 | 9.0 | 9.3 | 1.4 |
| | 2.0 | 4.4 | 13.6 | 10.0 | 10.0 |
| $C_{14}$ | .25 | 5.2 | 4.9 | 9.8 | 9.0 |
| | 1.0 | 13.3 | 10.2 | 13.0 | 8.0 |
| | 2.0 | 1.9 | 13.3 | 12.8 | 11.8 |
| $C_{16}$ | .25 | 9.6 | 5.9 | 11.8 | 3.9 |
| | 1.0 | 10.5 | 11.3 | 10.4 | 10.6 |
| | 2.0 | 8.8 | 8.1 | 10.4 | 4.9 |
| $C_{18}$ | .25 | 3.6 | 1.8 | 9.3 | 5.1 |
| | 1.0 | 12.0 | 8.1 | — | 4.3 |
| | 2.0 | 1.8 | 2.6 | 8.6 | 1.8 |
| None* | | 10.27 | 2.06 | 11.42 | 2.36 |
| | | ±3.55 | ±1.42 | ±1.36 | ±1.72 |

*Average of 22 for 28 days, 30 for 120 days

While the preferred embodiments of the invention are illustrated by the above, it is understood that the invention is not limited to the precise instructions herein disclosed and the right to all modifications coming within the scope of the following claims and equivalents thereof is reserved.

I claim:

1. A waterproofing agent primer composition which can be used on wet and dry structures that consisting essentially of
    a $C_8$ to $C_{18}$ fatty acid;
    a natural or synthetic rubber;
    a diluent or filler resin; and
    an organic solvent in which the fatty acid is soluble.

2. A waterproofing agent primer composition of claim 1 which includes about 0.1% to about 3% W/W of a $C_8$ to $C_{18}$ fatty acid.

3. A waterproofing agent primer composition of claim 2 in which the $C_8$ to $C_{18}$ fatty acid comprises myristic, stearic, lauric or palmitic acid.

4. A waterproofing agent primer composition of claim 3 which includes a natural or synthetic rubber selected from the group consisting of styrene-butadiene block copolymer and styrene-butadiene random copolymer.

5. A waterproofing agent primer composition of claim 4 which includes an alkylated aromatic petroleum hydrocarbon resin.

6. A waterproofing agent primer compositon of claim 5 wherein an organic solvent is xylene or mineral spirits.

7. A waterproofing agent primer composition of claim 1 comprising
myristic acid;
styrene-butadiene block copolymer;
an alkylated aromatic petroleum hydrocarbon resin; and
xylene.

8. A waterproofing agent primer composition of claim 7 wherein
myristic acid is present in a concentration of about 1% W/W; and styrene-butadiene block copolymer is present in a concentration of about 12%.

* * * * *